US012061637B2

(12) United States Patent
Wahl et al.

(10) Patent No.: US 12,061,637 B2
(45) Date of Patent: Aug. 13, 2024

(54) HEURISTIC IDENTIFICATION OF SHARED SUBSTRINGS BETWEEN TEXT DOCUMENTS

(71) Applicant: Microsoft Technology Licensing, LLC, Redmond, WA (US)

(72) Inventors: Mary Elizabeth Wahl, Pasadena, CA (US); Amanda Leah Mercier, Oakton, VA (US); George Taylor Corbett, Rockville, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 40 days.

(21) Appl. No.: 17/942,174

(22) Filed: Sep. 11, 2022

(65) Prior Publication Data

US 2024/0086442 A1    Mar. 14, 2024

(51) Int. Cl.
*G06F 16/33*    (2019.01)
*G06F 16/31*    (2019.01)
*G06F 16/338*   (2019.01)

(52) U.S. Cl.
CPC ............ *G06F 16/338* (2019.01); *G06F 16/31* (2019.01)

(58) Field of Classification Search
CPC ................................. G06F 16/338; G06F 16/03
See application file for complete search history.

(56) References Cited

U.S. PATENT DOCUMENTS

| 7,072,889 | B2 * | 7/2006 | Ogawa | G06F 16/319 |
| | | | | 707/999.005 |
| 7,734,671 | B1 * | 6/2010 | Ferguson | G06F 16/90344 |
| | | | | 707/753 |
| 9,760,546 | B2 * | 9/2017 | Galle | G06F 40/12 |
| 10,409,845 | B1 * | 9/2019 | Papamanthou | H04L 63/123 |
| 2006/0253439 | A1 * | 11/2006 | Ren | G06F 16/313 |
| | | | | 707/999.005 |
| 2009/0024555 | A1 * | 1/2009 | Rieck | G16B 40/30 |
| | | | | 706/54 |
| 2012/0036149 | A1 * | 2/2012 | Tsuboi | G06F 16/338 |
| | | | | 707/769 |
| 2012/0062589 | A1 * | 3/2012 | Iwayama | G06F 16/338 |
| | | | | 382/218 |
| 2017/0323061 | A1 * | 11/2017 | D'Souza | G16H 40/63 |
| 2018/0173710 | A1 * | 6/2018 | Maftuleac | G06F 16/3347 |

(Continued)

OTHER PUBLICATIONS

Nogueira, et al., "BowMapCL: Burrows-Wheeler Mapping on Multiple Heterogeneous Accelerators", In Journal of IEEE/ACM Transactions on Computational Biology and Bioinformatics, vol. 13, Issue 5, Sep. 2016, pp. 926-938.

(Continued)

*Primary Examiner* — Eliyah S. Harper
(74) *Attorney, Agent, or Firm* — Calfee, Halter & Griswold LLP (57) ABSTRACT

Technologies for document evaluation and identification of shared textual substrings between documents are described herein. Documents are evaluated and organized according to textual elements within the documents. A suffix index is generated from a reference document. The suffix index is used to identify common substrings of text within query documents using variable evaluation windows within the query documents. Indications of overlapping textual information between the reference document and query documents is generated as an output.

18 Claims, 6 Drawing Sheets

(56) References Cited

U.S. PATENT DOCUMENTS

2018/0173738 A1* 6/2018 Lopez-Ortiz ....... G06F 16/2246
2020/0357483 A1* 11/2020 Roquet ................. G16H 50/30

OTHER PUBLICATIONS

"International Search Report and Written Opinion Issued in PCT Application No. PCT/US23/027973", Mailed Date: Oct. 5, 2023, 11 Pages.

Xylogiannopoulos, et al., "Text Mining for Plagiarism Detection: Multivariate Pattern Detection for Recognition of Text Similarities", In Proceedings of the IEEE/ACM International Conference on Advances in Social Networks Analysis and Mining, Aug. 28, 2018, pp. 938-945.

Charalampopoulos, et al., "Faster Algorithms for Longest Common Substring", In Repository of arXiv:2105.03106v1, May 7, 2021, 30 Pages.

Gusev, et al., "Whole population, genome-wide mapping of hidden relatedness", In Journal of Genome Research, Feb. 1, 2009, pp. 318-326.

Li, et al., "Fast and accurate short read alignment with Burrows-Wheeler transform", In Journal of Bioinformatics, vol. 25, Issue 14, May 18, 2009, pp. 1754-1760.

Zhou, et al., "A Fast and Simple Method for Detecting Identity-by-Descent Segments in Large-Scale Data", In the American Journal of Human Genetics, vol. 106, Apr. 2, 2020, pp. 426-437.

* cited by examiner

FIG. 6

HEURISTIC IDENTIFICATION OF SHARED SUBSTRINGS BETWEEN TEXT DOCUMENTS

BACKGROUND

Document review and analysis with respect to documents in a document collection (such as may be found on a portable storage drive, on a hard drive of a computer user, etc.) is a time-intensive process requiring the ordering and categorization of an unknown and unorganized collection of documents. An example task of document review is to ascertain whether there is overlapping content between two or more documents in a document collection. Such reviews often employ computer-aided tools to group files together to aid review and decrease the likelihood of duplicative review efforts. Reviewers seek to gain efficiency through automatic identification of salient materials without needing to open and review each individual document file.

Conventional document evaluation methodologies have been used to identify duplicate documents in order to cut down the total amount of documents in a review set. However, these conventional methodologies are limited to evaluating documents as a whole and fail to detect granular differences between documents that might still share significant content overlap, such as various revisions of the same document.

Conventional approaches for identifying overlapping text in separate documents are further limited in their computational efficiency. For instance, a conventional document comparison tool, when searching for overlapping content in documents in a document collection, performs an exhaustive text-based comparison for each possible document pair in the document collection. This approach requires significant computational resources, particularly when the number of documents in the document collection grows and/or as lengths of documents grow.

SUMMARY

The following is a brief summary of subject matter that is described in greater detail herein. This summary is not intended to be limiting as to the scope of the claims.

Described herein are various technologies related to document evaluation and identification of shared substrings between text documents. According to an exemplary embodiment, a document evaluation application is configured to identify shared character substrings between text in documents. The document evaluation application comprises a document selector module, an indexer module, a partitioner module, a comparator module, a boundary identifier module, and an output module. The document evaluation application uses the various modules to evaluate text documents contained in a datastore and determine commonalities between the documents.

The document selector module evaluates documents in a datastore to determine a document length for each document. The length of a document can be a number of characters in the document or a number of tokens in the document, where a token in a tokenized document can represent a term, acronym, number, sequence of numbers, word, portion of a word, etc. As a tokenized document typically includes fewer tokens than a document includes characters, token-based analysis may offer computational benefits over character-based analysis. Comparisons at the token level may also be resilient to minor text alterations such as modification of punctuation or changes in verb tense/noun declension. In some embodiments, the document selector module tokenizes one or more documents in the datastore.

Based upon the lengths of the documents, the document selector module identifies a reference document to compare with other documents within the datastore. In an example, the document selector module selects the longest document in the datastore to be the reference document. Once the reference document has been selected, an indexer module creates an index-based representation of the reference document. The process of generating the index-based representation of a document is referred to herein as "indexing". In some embodiments, the indexer module generates a suffix index (also referred to herein as a "suffix array") for the reference document. A suffix index is a sorted array of all suffixes contained in a document. According to some embodiments, the indexer module uses a Burrows-Wheeler Alignment (BWA) to generate the suffix array for the reference document.

After the reference document has been indexed, the document selector module selects a second document from the data store to be used as a query document; for instance, the document selector module selects the second document based upon length of the second document (in tokens or characters). The partitioner module analyzes the query document to extract text substrings included in evaluation windows of the query document. Evaluation windows are of a fixed length (characters or tokens) and are non-contiguous within the query document. Evaluation windows may be created by traversing the query document by a fixed first character/token value and extracting a sub string of a second character/token value. As an example, an evaluation window of 25 characters may be created every 1000 characters in a document.

Responsive to extracting the substrings from the evaluation windows, the comparator module searches the suffix index using the extracted substrings as a query to ascertain whether the reference document includes one or more of the extracted sub strings (and thus to determine whether the text in a sub string extracted from the query document is also included in the reference document). When it is determined that the reference document includes the substring in an evaluation window of the query document, the boundary identifier module can modify the evaluation window to determine where, in both the reference document and the query document, the text overlap starts and stops. For instance, the boundary identifier module extends the evaluation window forward and/or backward in the text to identify the boundaries of the overlapping text in the reference document and the query document. In a specific example, when the boundary identifier module ascertains that substrings in two adjacent evaluation windows of the query document are included in the reference document, the boundary identifier can presume that text between the two adjacent evaluation windows in the query document is also included in the reference document. Once the boundaries of the overlapping text are identified in both the reference document and the query document, the output module outputs an indication that the reference document and the query document include overlapping text. The presence and location of the overlapping material may be logged in the datastore or in another memory.

In another example, rather than indexing a single reference document and comparing the suffix array with sub strings extracted from query documents, text can be extracted from all documents in a document collection and concatenated, thereby forming a reference document (which includes text from all documents), where the reference document can include markers that identify boundaries of the individual documents that make up the reference document. The reference document is then indexed to form a suffix array that is representative of the reference document. Substrings can then be extracted from the documents in the document collection and used to query the suffix array (where "hits" corresponding to a document from which a substring is extracted are ignored when they occur within the position of the document in the suffix array).

The technologies described herein exhibit various advantages over conventional technologies. In conventional technologies, documents are often compared in their entirety using a checksum comparison. This approach fails to detect how documents may be similar but not exact copies. As an example, if a document set has many different revisions of a single document, conventional document analysis tools will treat each document as distinct because they are not 1:1 matches. However, utilizing the evaluation and identification methodologies as described herein, documents may be determined to have significant overlapping textual material, and therefore treated as the same or similar documents. Additionally, conventional systems suffer from many computational inefficiencies that require evaluation of a document as a whole, which requires significant resources and becomes even less effective if a document set includes very large texts. In another example, conventional technologies for identifying near-duplicate text can include generating bags of words for two different documents and searching for overlap between such words. In another approach, two documents can be represented by respective word vectors, and similarity between the documents can be estimated based upon cosine similarity between such documents. These approaches are designed to identify documents that have topical similarity; however, using such approaches it is difficult to choose a degree of overlap (or minimum cosine similarity) that does not result in many false positives. For instance, two documents include many of the same words or have similar keywords because the two documents discuss similar topics, but the documents do not share common phrasing. The technologies described herein are advantageous over such conventional approaches, as the technologies described herein can be used to identify identical substrings and locations of such substrings in documents (where the identical substrings can indicate updated documents versions, plagiarism, quotation, and so forth).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the detailed description of the illustrated embodiments, which is to be read in connection with the accompanying drawings.

BRIEF DESCRIPTION OF THE DRAWINGS

FIGS. 2A-F illustrate identification of shared substrings between a reference document and a query document.

DETAILED DESCRIPTION

Described herein are various technologies pertaining to the evaluation and identification of shared substrings between documents that include text. For example, reference document is selected from a set of documents based upon the length of the reference document, where the documents in the set of documents are organized according to their length, e.g., the number of characters or tokens in the document. The reference document can be selected due to the reference document being the longest document in the set. A suffix index is generated for the reference document based upon the text of the reference document. The suffix index results in a searchable array of all suffixes contained within the reference document.

A query document is selected from the set of documents (e.g., based upon its length) and is partitioned into evaluation windows. An evaluation window includes a substring of the query document, and evaluations windows are non-contiguous in the query document. The substrings within the evaluation windows are extracted and compared against the suffix index of the reference document. Based upon this comparison, common substrings between the reference document and the query document are identified. Once a common substring has been identified, the evaluation window can be expanded (e.g., the evaluation window can be lengthened forward or backward), and the substring within the (expanded) evaluation window is compared with the suffix index. Such process can repeat until boundaries of the overlapping text are identified. Upon the boundaries of the of overlapping text between two documents being identified, an indication is that there is overlap in text between documents is output. Optionally, the indication is a visualization that identifies the extent and location(s) of the overlap. The process is then repeated until each document is effectively compared with every other document in the document set.

In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Further, as used herein, the term "exemplary" is intended to mean serving as an illustration or example of something and is not intended to indicate a preference.

Further, as used herein, the terms "component", "system", "module", and "model" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Figure 1:
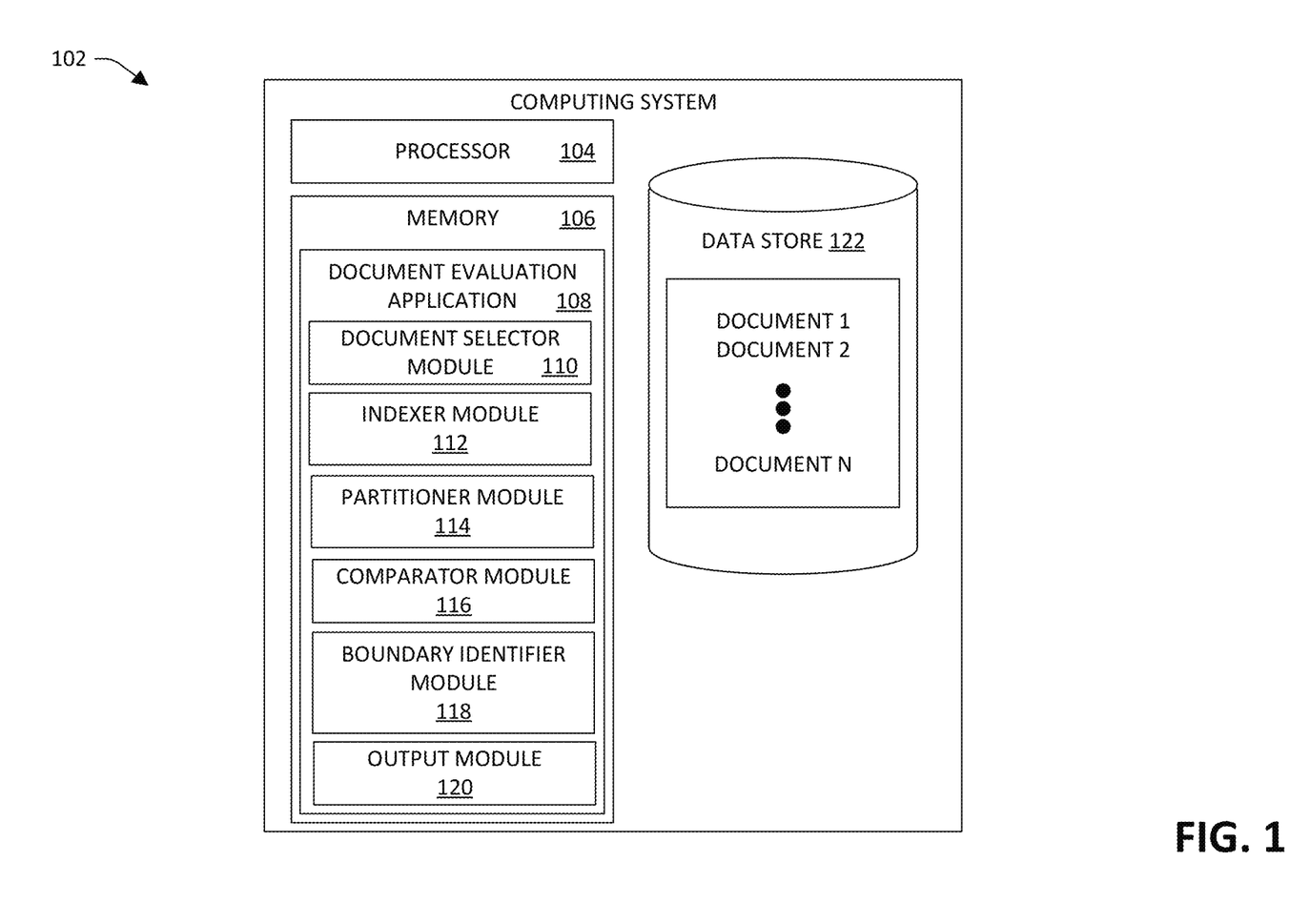
FIG. 1 illustrates a system for evaluation and identification of shared substrings between text documents.

With reference to FIG. 1, a computing system 100 for document evaluation and identification of shared substrings between documents that include text is illustrated. The computing system 102 comprises a processor 104 and memory 106. The memory 106 has computer-readable instructions stored thereon, which, when executed by the processor 104, cause the processor to perform certain acts, steps, functions, or the like. The memory 106 has a document evaluation application 108 stored therein which, when executed by the processor 108, causes the processor 108 to perform document evaluation and identification actions as described herein. The system 100 may be connected to one or more external computing devices by way of a network, such as the Internet, intranet, or the like. While shown here as an application executed by the processor 104, the document evaluation application 108 can be a distributed application having both server side (via a server document evaluation application executing on a server computing device) and client side (via a client document evaluation application executing on a client computing device) functionality.

The document evaluation application 108 comprises a document selector module 110, an indexer module 112, a partitioner module 114, a comparator module 116, a boundary identifier module 118, and an output module 120. The document evaluation application 108 evaluates documents included in a datastore 122 and determines commonalities (overlapping text) between texts of the documents. Through identification of shared substrings between documents, the evaluation application 108 enables unstructured document groups to be grouped together according to similarities within the documents. Certain of these similarities may be further recognized by document evaluation application 108 in a contextual manner which further aids in the categorization and grouping of the documents.

The document selector module 110 determines lengths of documents in the data store 122. In an example, the length of a document is a number of characters in the document. In another example, a document can be tokenized, and a length of the document is a number of tokens in the (tokenized) document. Accordingly, the document selector module 110 can tokenize the documents in the datastore 122. The document selector module 110 may sort documents in the datastore 122 according to document length.

The document selector module 110 identifies a reference document from the data store 122 based upon lengths of the documents in the data store 122. For example, the document selector module 110 selects the longest document in the datastore to be the reference document. Once the reference document has been selected by the document selector module 110, the indexer module 112 creates an index-based representation of the reference document (where creating an index-based representation of a document is referred to herein as "indexing"). Indexing the reference document can include generating a suffix index (otherwise referred to herein as a "suffix array") for the reference document. A suffix index for the reference document is a sorted array of all suffixes included in the reference document.

In an example, the indexer module 112 uses a Burrows-Wheeler Alignment (BWA) to generate the suffix array for the reference document. In an example, a character string (e.g., all or a portion of a text document stored in datastore 122) is transformed using the BWA to generate a suffix array for the document. The resultant suffix array is a permutation of the order of the characters within the character string. Said another way, the resultant suffix array allows for quick identification of substrings that are repeated within the document and the frequency of their appearance. By utilizing a suffix array of the reference document, localized substrings can be identified within the reference document by way of a backward search.

After the suffix array has been generated for the reference document, the document selector module 110 is selects a second document from the data store to be used as a query document. The document selector module 110 selects the query document based upon a length of the query document relative to other documents in the data store 122. For example, the reference document is the longest document in the data store 122 and the query document is the second longest document in the data store 122. The partitioner module 114 then defines evaluation windows over the text of the query document. For instance, the text (characters or tokens) is placed in an array, and evaluation windows are defined over respective portions of that array, where the evaluation windows respectively cover non-contiguous substrings in the array. In an example, the evaluation windows are of a fixed length (characters or tokens), with adjacent evaluation windows being separated by a fixed number of character or tokens. In another example, the evaluation windows are of a fixed length, with adjacent evaluation windows being separated by a randomly or pseudorandomly selected number of characters or tokens. In yet another example, the evaluation windows are of a random or pseudorandom length, with adjacent evaluation windows being separated by a randomly or pseudorandomly selected number of characters or tokens. As an example, an evaluation window of 25 characters may be created every 1000 characters in a document. The partitioner module 114 subsequently extracts substrings from the text that are covered by the respective evaluation windows. Continuing with the example set forth above, when the text is 10,000 characters, the partitioner module extracts ten character substrings, each of which are 25 characters in length.

After the partitioner module 114 extracts the substrings covered by the evaluation windows, the comparator module 116 searches the suffix for each of the extracted substrings to determine whether the reference document includes one or more of the substrings (and thus to identify overlapping text between the reference document and the query document). The comparator module 116 is able to perform this process in a computationally efficient manner because searching the suffix array of the reference document is much faster than searching for substrings within an unindexed document.

The boundary identifier 118 module may perform further processing to identify more precise boundaries in the reference document and the query document where there is overlapping (identical) text. For instance, upon the comparator module 116 determining that a substring covered by an evaluation window is included in the reference document, the boundary identifier module 118 can modify size of the evaluation window, extract a substring covered by the (modified) evaluation window, and search the suffix array for such substring. In a non-limiting example, the boundary identifier module 118 can expand the evaluation window one character to the left, extract the substring covered by such (expanded) window, and the comparator module 116 can search the suffix array for the substring. When the comparator module 116 determines that the suffix array includes the substring, the evaluation window can again be expanded, and the process can repeat until the leftward boundary is identified. The boundary identifier module 118 and the comparator module 116 can perform the same operations in the other direction until both boundaries are identified.

The above is set forth as an example, and it can be ascertained that the boundary identifier module 118 can expand the boundaries of the evaluation windows by more than one character or token at a time in connection with searching for a precise boundary. Further, to conserve computational resources, when substrings extracted from adjacent evaluation windows in the query document are determined to be included in the reference document, the boundary identifier component 118 can presume that text between such substrings is also included in the reference document.

Once the boundaries of each evaluation window are determined by the boundary identifier module 118, the output module 120 is configured to output an indication that the reference document and the query document include overlapping text. For instance, the output module 120 generates a visualization related to the presence and location of identified overlapping text matter in both the reference document and the query document. The document evaluation application 108 can then cause the visualizations to be displayed at an external computing device (not shown). The presence and location of the overlapping material may also be logged in the datastore 122 or other computer-readable storage.

The resultant output from output module 120 enables the document evaluation application 108 to form contextual groupings of the documents within the datastore 122. For example, shared substrings that are indicative of a title or authorship of a document allow for simple categorization of documents. As a further example, shared substrings beyond a certain length may be indicative that documents are revised versions of the same content.

After the query document has been compared with the reference document, the document selector module 110 can select a new query document from the data store 122 (e.g., the document selector module 110 can select a next longest document from the data store 122). After the reference document has been compared with every other document in the document store 108 (e.g., the suffix array for the reference document has been compared with substrings extracted from every other document in the data store 122), the document selector module 110 can select another document from the data store 122 as a new reference document. For example, the document selector module 110 selects the next longest document from the data store as the new reference document. This process is repeated until all documents have been compared with one another.

It can be ascertained that the approach described above lends itself to parallelization. For example, the five longest documents from the data store are selected as reference documents, and each reference document is assigned to a computing node. These five reference documents are compared with the other documents in the data store in parallel.

In another example, rather than the reference document representing a single document from the document collection, the reference document represents all documents in the document collection. Thus, in such example, text is extracted from all documents in the document collection and concatenated together to form the reference document. Boundaries of text of individual documents is identified in the reference document or otherwise stored. A suffix array is generated based upon the reference document, such that the suffix array represents the reference document. The suffix array is queried with substrings extracted from documents of the document collection in the manner described above, where "hits" for a substring extracted from a document that correspond to a location in the suffix array of the document are ignored. More specifically, text extracted from a document can be within a first region of the reference document. When a substring extracted from the document is compared with the suffix array, hits that correspond to the first region are ignored, while hits that occur outside of the first region are retained.

Figure 2A:
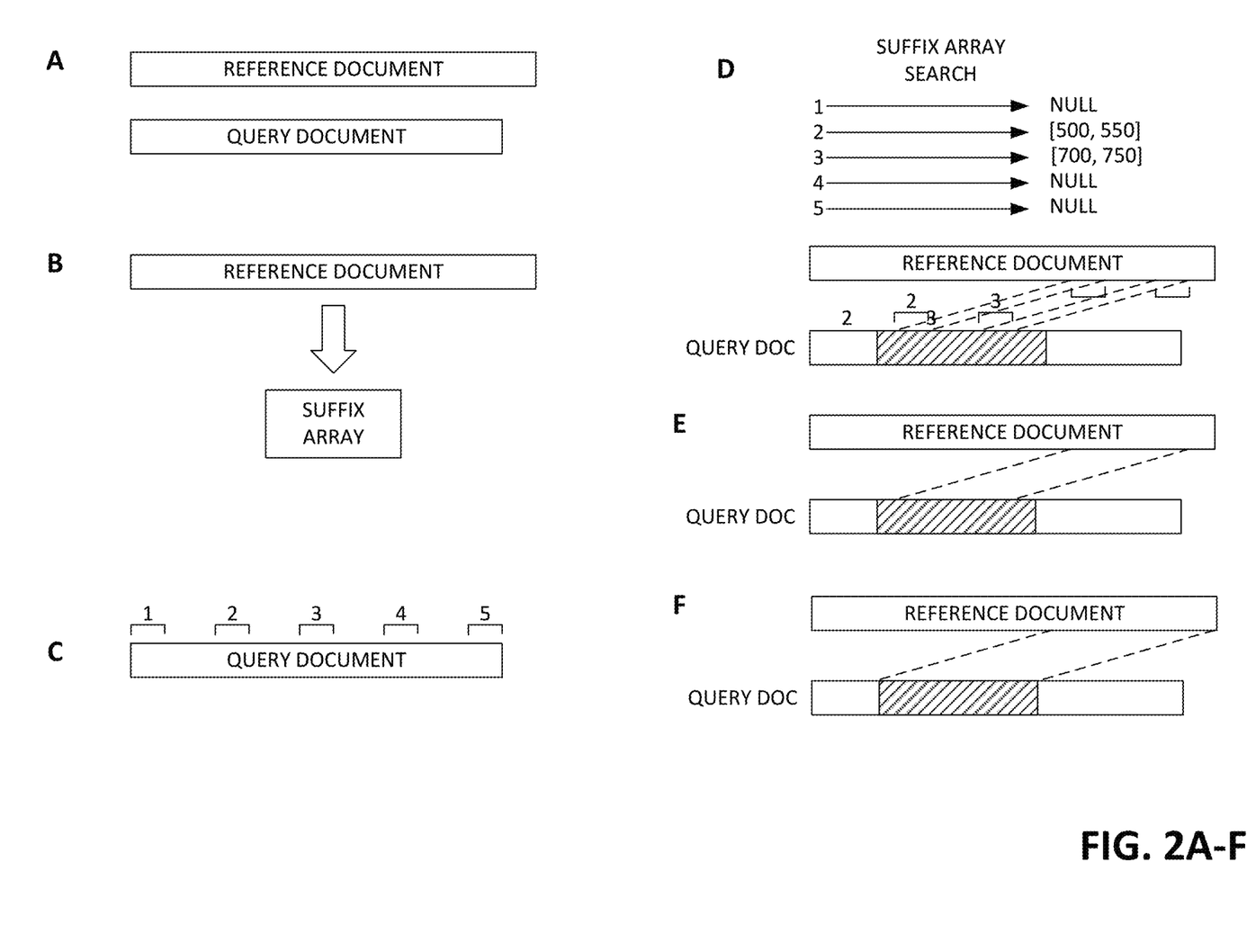

FIGS. 2A-2F illustrate an operation of the evaluation application 108. FIG. 2A is a schematic that depicts a reference document and a query document relative to one another as linear strings. In FIG. 2B, as shown, the reference document is indexed (e.g., by indexer module 112) using the Burrows-Wheeler Alignment to create a suffix array for the reference document. FIG. 2C depicts evaluation windows relative to content of the linear array of the query document. In the example of FIG. 2C, the evaluation windows are of a fixed size (in characters or tokens) and dispersed within the query document at fixed distances from one another.

FIG. 2C shows 5 evaluation windows (numbered 1-5) within a query document. FIG. 2D shows the resultant search output of the 5 evaluation windows using the suffix array. As illustrated, evaluation window 1 is associated with a null result, meaning that there is no overlapping text between a first substring in evaluation window 1 and text of the reference document (as represented by the suffix array). Evaluation window 2, however, is associated with a "hit", meaning that a second substring covered by evaluation window 2 exists in the reference document (starting at location 500 in the suffix array and ending at location 550 in the suffix array). Similarly, evaluation window 3 is associated with a "hit", as a third substring covered by evaluation window 3 in the query document exists in the reference document. Evaluation windows 4 and 5, like evaluation window 1, are associated with null results.

Also shown in FIG. 2D, the corresponding textual portions of the reference document are shown adjacent to the query document and evaluation windows 2 and 3. Because evaluation windows 2 and 3 are consecutive windows, it can be presumed that text between the two windows is also included in the reference document. In some embodiments, the rightward boundary of evaluation window 2 and the leftward boundary of evaluation window 3 may be extended to create a contiguous evaluation window of overlapping text. The boundaries of the resultant 2-3 contiguous evaluation may then be extended linearly as a singular evaluation window. Through expansion of these boundaries, the outer bounds of the overlapping text within the query document are determined (e.g., by boundary identifier module 118). A resultant indication of the overlapping text can then be generated as output. This process is continued for each document pair in a set of documents. After all document pairs have been considered, the first reference document is dropped from the document set and the next longest document becomes the reference document. This continues until all n-choose-2 document pairs have been processed.

Figure 3:
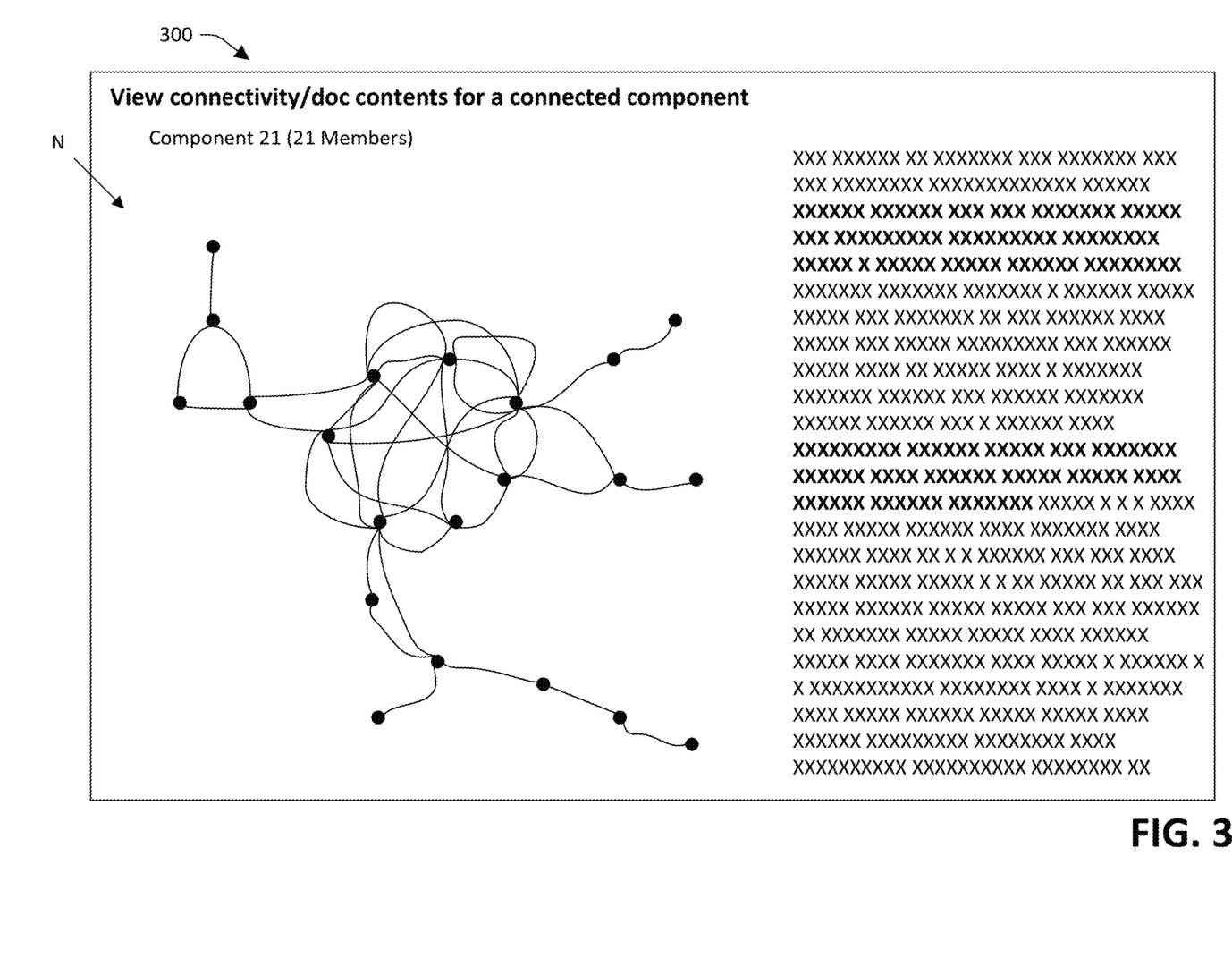
FIGS. 3-4 show visualizations related to identified shared substrings between documents.
Figure 4:
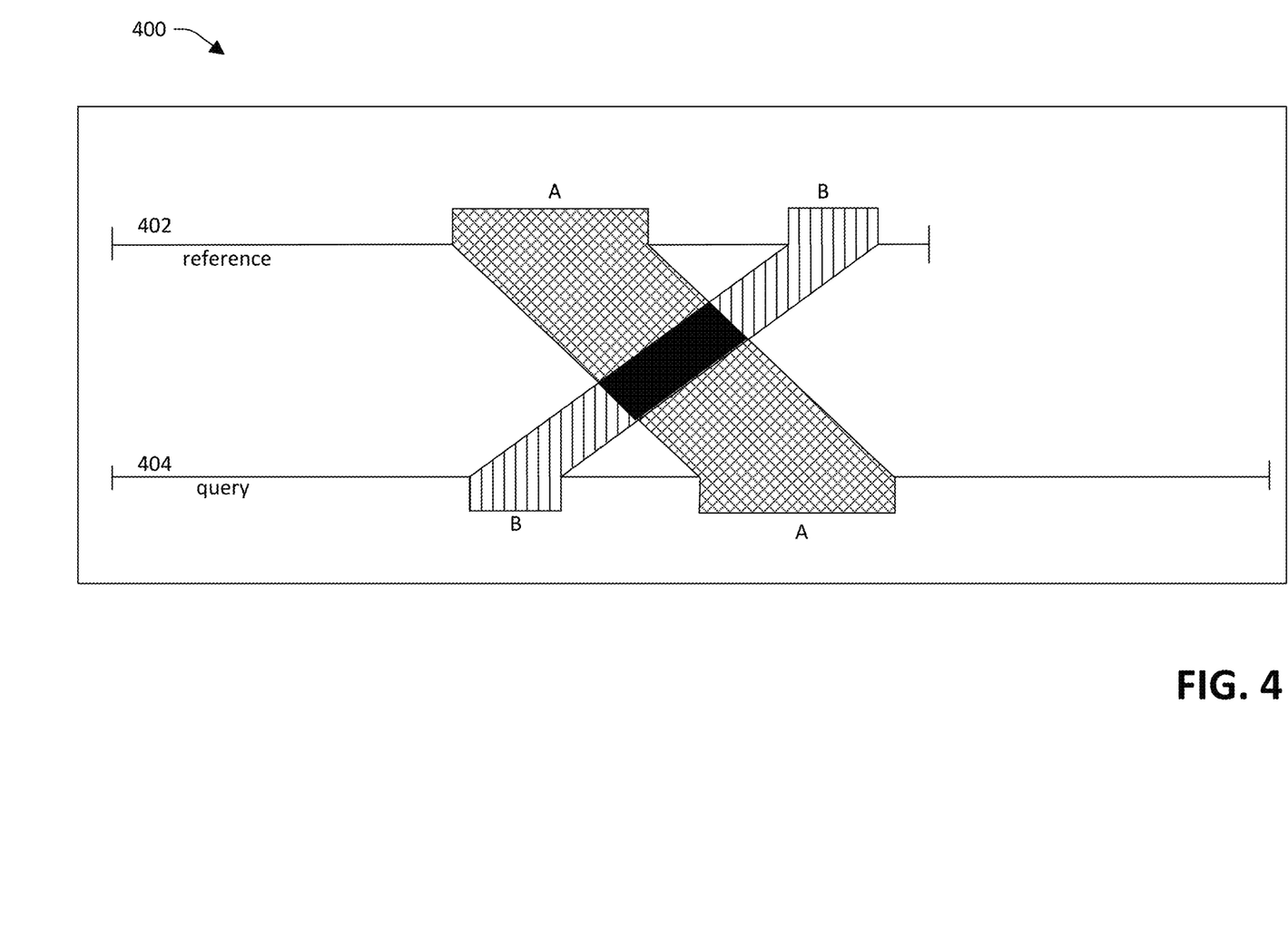

FIGS. 3-4 illustrate exemplary visualizations that may be generated based on the output of the document evaluation application 108. In an exemplary embodiment, the document evaluation application 108 is configured to cause the visualizations shown in FIG. 3-4 to be displayed at an external user device, for example, using a graphical user interface (GUI) at the external user device. An external user device can be used to view additional output from the document evaluation application 108.

FIG. 3 illustrates an exemplary visualization 300 generated by output module 120. The visualization 300 shows a node graph N comprising nodes representative of documents in a document set. Each edge drawn between the nodes is indicative of a shared substring that has been identified between the two documents. Responsive to a selection of a node in the node graph, text from the document associated with the selected node is displayed. As illustrated, shared substrings within the text are bolded relative to the document text that is not part of the shared substring.

FIG. 4 illustrates another exemplary visualization 400 generated by output module 120. The visualization 400 illustrates graphically the alignment between a reference document 402 and a query document 404. As shown the two documents share common substrings A and B. These substrings occur in inverted order in the two documents, however, visualization 400 graphically illustrates positional information that may be useful in evaluating the contextual relationship between the reference document 402 and the query document 404.

Figure 5:
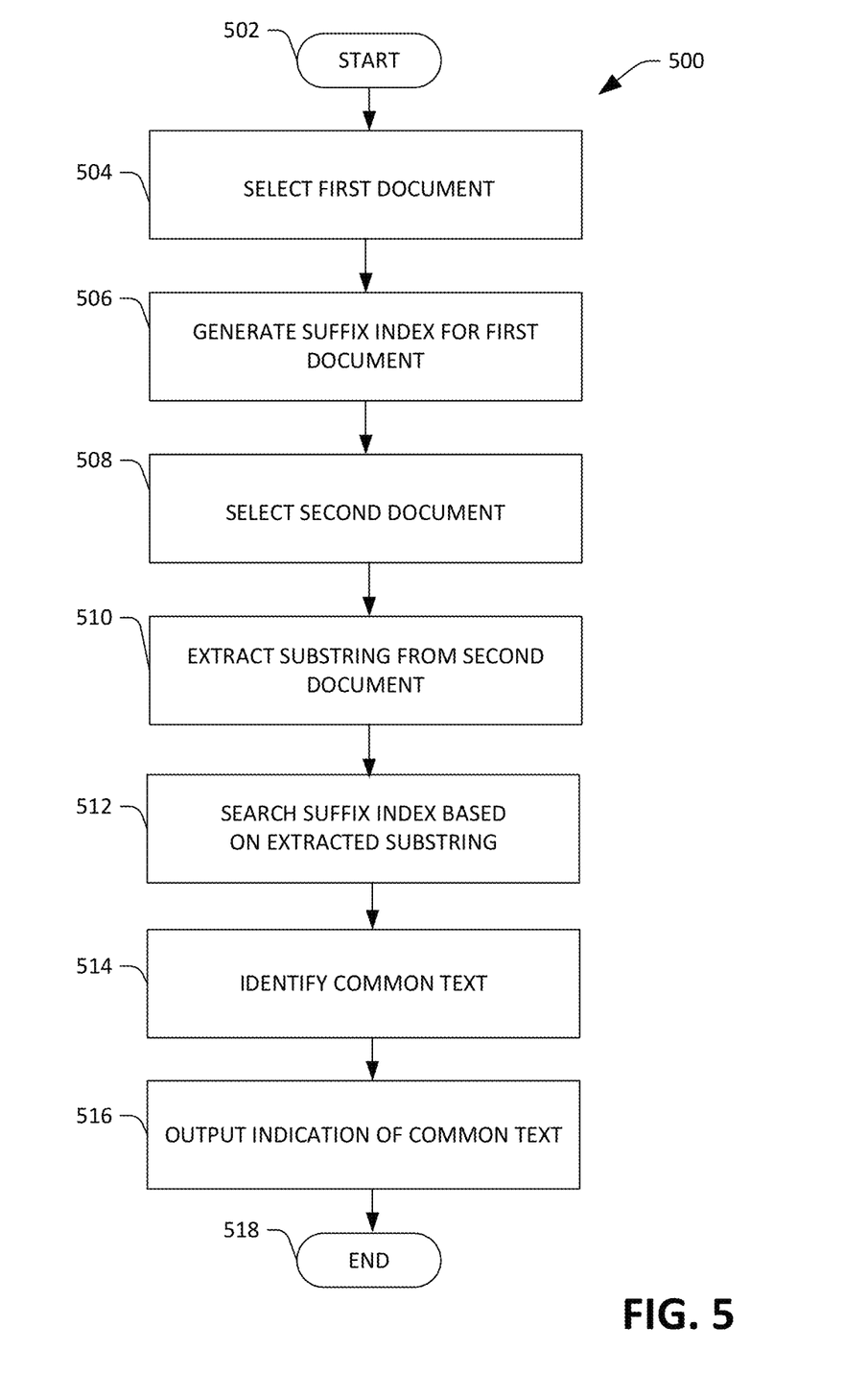
FIG. 5 illustrates a method for evaluation and identification of shared substrings between text documents.

FIG. 5 illustrates an exemplary methodology 500 relating to evaluating documents and identifying shared substrings between documents in a document set. While the methodology 500 is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

The methodology 500 begins at 502, and at 504, a first document is selected from a set of documents. The first document may be selected based on the length of the first document relative to other documents in the document set. For instance, the first document is the longest document in the document set.

At 506, a suffix index is generated for the first document based upon the texts of the first document. For example, the suffix index is generated using a Burrows-Wheeler Alignment (BWA). The resultant suffix index enables fast and efficient searching of substrings that occur within the text of the first document.

At 508, a second document is selected from the set of documents. Pursuant to an example, the second document is the second longest document within the set of documents.

At 510, substrings are extracted from the second document. The extracted substrings are taken from evaluation windows that cover the second document. The evaluation windows are defined by a first and second boundary within the document and are a fixed size relative to the document (either a fixed number of characters or tokens).

At 512, the suffix index is searched based on the substrings extracted from the second document.

At 514, commonly shared substrings are identified between the first document and the second document based on the results of the suffix index search.

At 516, an output is generated indicative of the identified common substrings between the first and second documents.

The technologies described herein allow for efficient evaluation of textual documents and identification of shared sub strings between documents in a set of documents. The methodology 500 completes at 518. It is appreciated that the above-described methodology is repeatable for every document in a set of documents. In an example, once an output indicative of the overlapping substrings between the first and second document has been generated, the process can be repeated for subsequent documents in the set of documents. In certain embodiments, the subsequent documents are selected based on their length, wherein each subsequently evaluated document is selected in descending order of document length. Once all document pairs have been considered, the first reference document may be dropped from the document set and a new reference document can be selected (e.g., the next longest document). This process can then be repeated until all n-choose-2 document pairs have been evaluated.

From the foregoing, aspects have been described herein according to at least the following examples.

(A1) In an aspect, a method disclosed herein includes selecting a first document from a set of documents based upon a length of the first document, wherein the first document comprises first text. The method also includes generating a suffix index for the first document based upon the first text of the first document. The method additionally includes selecting a second document from the set of documents, wherein the second document comprises second text. The method further includes extracting a substring from the second text, wherein the substring is less than an entirety of the second text. The method also includes searching the suffix index based upon the substring extracted from the second text. The method further includes based upon the searching of the suffix index, identifying that the first text of the first document includes the substring extracted from the second text of the second document. The method additionally includes based upon the searching of the suffix index, identifying that the first text of the first document includes the substring extracted from the second text of the second document.

(A2) In some embodiments of the method of (A1), generating the suffix index comprises utilizing a Burrows-Wheeler Alignment (BWA) algorithm.

(A3) In some embodiments of the method of at least one of (A1)-(A2), the method also includes responsive to outputting the indication that the first document and the second document include overlapping text: generating a visualization indicative of the overlapping text; and causing the visualization to be displayed at a graphical user interface.

(A4) In some embodiments of the method of at least one of (A1)-(A3), the method also includes selecting a third document from the set of documents, wherein the third document comprises third text. The method further includes extracting a second substring from the third text, wherein the substring is less than an entirety of the third text. The method also includes searching the suffix index based upon the second substring extracted from the third text. The method additionally includes based upon the searching of the suffix index, identifying that the first text of the first document includes the second substring extracted from the third text of the third document. The method further includes outputting an indication that the first document and the third document include overlapping text based upon the first text of the first document including the second substring extracted from the third text of the third document. The method also includes repeating the selecting, extracting, searching, identifying, and outputting steps for each document in the set of documents.

(A5) In some embodiments of the method of at least one of (A1)-(A4), the extracted substring of the second text corresponds to an evaluation window.

(A6) In some embodiments of the method of (A5), the method includes expanding the evaluation window subsequent to identifying that the first text of the first document includes the substring extracted from the second text of the second document.

(A7) In some embodiments of the method of at least one of (A1)-(A6), the first document and the second document are tokenized documents.

(A8) In some embodiments of the method of at least one of (A1)-(A7), the length of the first document is greater than a length of the second document.

(B1) In another aspect, a computing system includes a processor and memory, where the memory stores instructions that, when executed by the processor, causes the processor to perform a method disclosed herein (e.g., any of (A1)-(A8)).

(C1) In yet another aspect, a computer-readable storage medium includes instructions that, when executed by a processor, cause the processor to perform a method disclosed herein (e.g., any of (A1)-(A8)).

Figure 6:
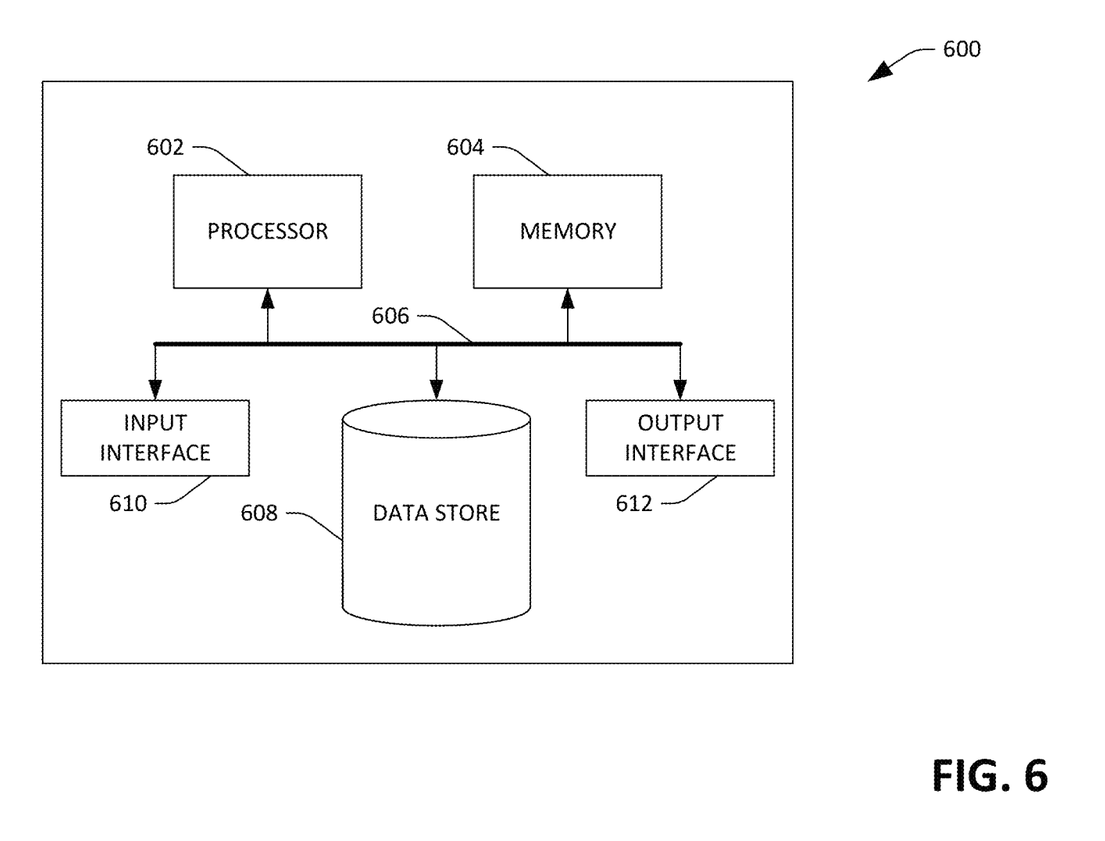
FIG. 6 illustrates a computing device.

Referring now to FIG. 6, a high-level illustration of an example computing device 600 that can be used in accordance with the systems and methodologies disclosed herein is illustrated. It is appreciated that computing device 102 is one exemplary implementation of computing device 600. For instance, the computing device 600 may be used in a system for evaluation of document and identification of shared substrings between text documents. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606.

The computing device 600 additionally includes a data store 608 that is accessible by the processor 602 by way of the system bus 606. The data store 608 may include executable instructions, documents, output data such as the location and nature of identified common document substrings, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
a processor; and
memory storing instructions that, when executed by the processor, cause the processor to perform acts comprising:
selecting a first document from a set of documents based upon a length of the first document, wherein the first document comprises first text;
generating a suffix index for the first document based upon the first text of the first document;
selecting a second document from the set of documents, wherein the second document comprises second text;
extracting a substring from the second text, wherein the substring is less than an entirety of the second text;
searching the suffix index based upon the substring extracted from the second text;
based upon the searching of the suffix index, identifying that the first text of the first document includes the substring extracted from the second text of the second document;
outputting an indication that the first document and the second document include overlapping text based upon the first text of the first document including the substring extracted from the second text of the second document;
responsive to outputting the indication that the first document and the second document include overlapping text, generating a visualization indicative of the overlapping text; and
causing the visualization to be displayed at a graphical user interface.

2. The system of claim 1, wherein generating the suffix index comprises utilizing a Burrows-Wheeler Alignment (BWA) algorithm.

3. The system of claim 1, the acts further comprising:
selecting a third document from the set of documents, wherein the third document comprises third text;
extracting a second substring from the third text, wherein the substring is less than an entirety of the third text;
searching the suffix index based upon the second substring extracted from the third text;
based upon the searching of the suffix index, identifying that the first text of the first document includes the second substring extracted from the third text of the third document;
outputting an indication that the first document and the third document include overlapping text based upon the first text of the first document including the second substring extracted from the third text of the third document; and
repeating the selecting, extracting, searching, identifying, and outputting steps for each document in the set of documents.

4. The system of claim 1, wherein the extracted substring of the second text corresponds to an evaluation window.

5. The system of claim 4, the acts further comprising expanding the evaluation window subsequent to identifying that the first text of the first document includes the substring extracted from the second text of the second document.

6. The system of claim 1, wherein the first document and the second document are tokenized documents.

7. The system of claim 1, wherein the length of the first document is greater than a length of the second document.

8. A method for identifying shared substrings between text documents, the method comprising:
selecting a first document from a set of documents based upon a length of the first document, wherein the first document comprises first text;
generating a suffix index for the first document based upon the first text of the first document;
selecting a second document from the set of documents, wherein the second document comprises second text;
extracting a substring from the second text, wherein the substring is less than an entirety of the second text;
searching the suffix index based upon the substring extracted from the second text;
based upon the searching of the suffix index, identifying that first text of the first document includes the substring extracted from the second text of the second document;
outputting an indication that the first document and the second document include overlapping text based upon the first text of the first document including the substring extracted from the second text of the second document;
responsive to outputting the indication that the first document and the second document include overlapping text, generating a visualization indicative of the overlapping text; and
causing the visualization to be displayed at a graphical user interface.

9. The method of claim 8, wherein generating the suffix index is generated by way of a Burrows-Wheeler Alignment (BWA) algorithm.

10. The method of claim 8, further comprising:
selecting a third document from the set of documents, wherein the third document comprises third text;
extracting a second substring from the third text, wherein the second substring is less than an entirety of the third text;
searching the suffix index based upon the second substring extracted from the third text;
based upon the searching of the suffix index, identifying that first text of the first document includes the second substring extracted from the third text of the third document;
outputting an indication that the first document and the third document include overlapping text based upon the first text of the first document including the second substring extracted from the third text of the third document; and
repeating the selecting, extracting, searching, identifying, and outputting steps for each document in the set of documents.

11. The method of claim 8, wherein the extracted substring of the second text corresponds to an evaluation window.

12. The method of claim 11, further comprising expanding the evaluation window subsequent to identifying that the first text of the first document includes the substring extracted from the second text of the second document.

13. The method of claim 8, wherein the first document and the second document are tokenized documents.

14. The method of claim 8, wherein the length of the first document is greater than a length of the second document.

15. A computer-readable storage medium comprising instructions that, when executed by a processor, cause the processor to perform acts comprising:
   generating a reference document that represents text of several documents in a set of documents;
   generating a suffix index for the reference document based upon the text of the several documents in the set of documents;
   selecting a query document from the set of documents, wherein the query document comprises first text;
   extracting a substring from the first text, wherein the substring is less than an entirety of the first text;
   searching the suffix index based upon the substring extracted from the first text;
   based upon the searching of the suffix index, identifying that the second text of a document in the set of documents includes the substring extracted from the first text of the query document; and
   outputting an indication that the query document and the document include overlapping text based upon the second text of the document including the substring extracted from the first text of the query document;
   responsive to outputting the indication that the first document and the second document include overlapping text, generating a visualization indicative of the overlapping text; and
   causing the visualization to be displayed at a graphical user interface.

16. The computer-readable storage medium of claim 15, wherein the suffix index is generated through use of a Burrows-Wheeler Alignment (BWA) algorithm.

17. The computer-readable storage medium of claim 15, the acts further comprising:
   extracting the text of the several documents from the several documents;
   concatenating the text of the several documents, wherein the reference document is based upon the concatenating of the text.

18. The computer-readable storage medium of claim 17, the acts further comprising:
   tokenizing the text extracted from the several documents to form tokenized text, wherein the reference document is based upon the tokenized text.

\* \* \* \* \*